Feb. 16, 1943. N. C. PRICE Re. 22,272

PRESSURE CONTROL SYSTEM FOR AIRCRAFT CABINS

Original Filed July 19, 1937 3 Sheets-Sheet 1

Inventor
Nathan C. Price
By Charles L. Reynolds
Attorney

Feb. 16, 1943. N. C. PRICE Re. 22,272
PRESSURE CONTROL SYSTEM FOR AIRCRAFT CABINS
Original Filed July 19, 1937 3 Sheets-Sheet 2
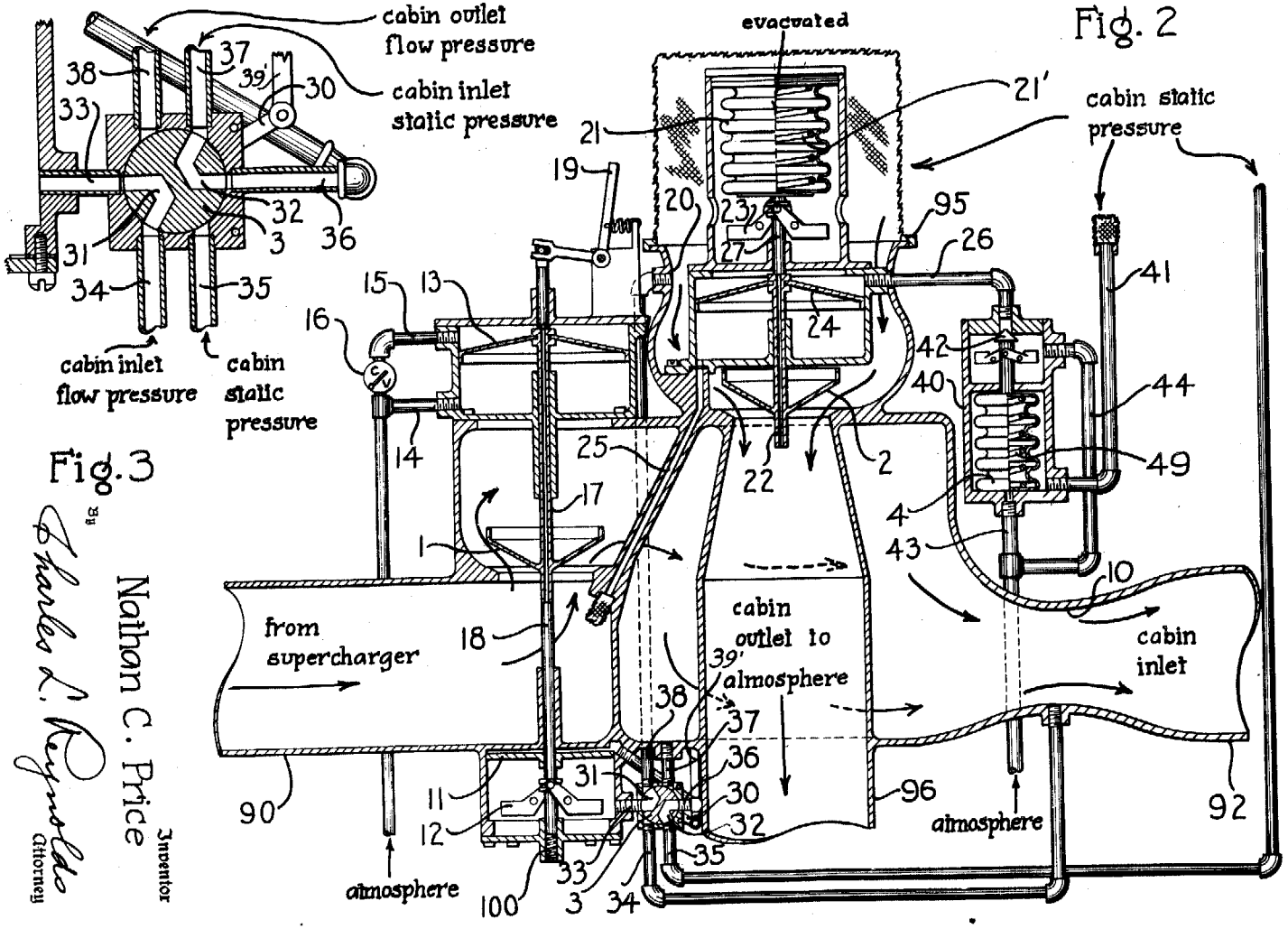
Inventor
Nathan C. Price
By Charles L. Reynolds
Attorney Feb. 16, 1943. N. C. PRICE Re. 22,272
PRESSURE CONTROL SYSTEM FOR AIRCRAFT CABINS
Original Filed July 19, 1937 3 Sheets-Sheet 3
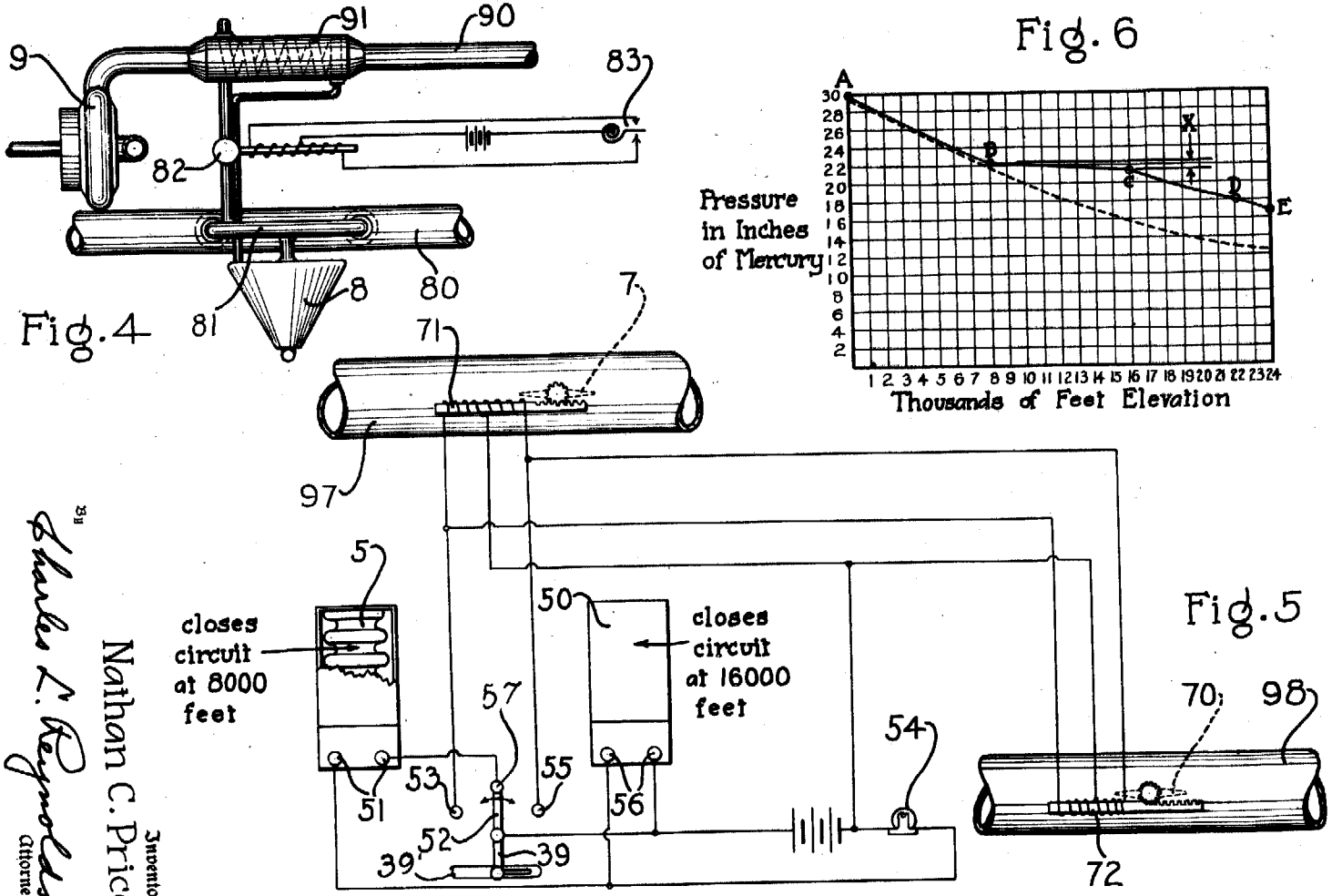
Inventor
Nathan C. Price
By Charles L. Reynolds
Attorney Reissued Feb. 16, 1943 Re. 22,272

UNITED STATES PATENT OFFICE 22,272

PRESSURE CONTROL SYSTEM FOR AIRCRAFT CABINS

Nathan C. Price, Hollywood, Calif., assignor, by mesne assignments, to Boeing Aircraft Company, Seattle, Wash., a corporation of Washington Original No. 2,208,554, dated July 16, 1940, Serial No. 154,438, July 19, 1937. Application for reissue November 12, 1940, Serial No. 365,396

89 Claims. (Cl. 244—59)

In order to promote the comfort of passengers in airplanes designed to fly at high altitudes, and indeed to avoid harmful physiological effects upon the passengers and crew, due to low pressure at high altitudes, it is necessary to supercharge the cabins of high altitude aircraft. However, there is a point beyond which supercharging cannot be carried practically, for the reason that if an attempt is made to maintain within the cabin an absolute pressure level (for instance if it is attempted to maintain sea level pressures or pressures not lower than some given pressure altitude) at appreciably higher altitudes, there are produced bursting stresses to contain which necessitates very greatly strengthening the cabin and reinforcing it. The added weight makes the aircraft, because of reduction of pay load, economically impracticable. It becomes necessary, in an economic sense, to lighten the structure, especially when the airplane is a large, many-passenger type. This, for structural reasons, entails reduction of the maximum possible pressure difference, as between cabin pressure and external pressure. This also requires the provision of automatic controls to insure that never, under any circumstances, will this selected differential of pressure be exceeded, whether the tendency to exceed it may arise from an excessive rise or rate of rise of cabin pressure or from an excessive drop or rate of drop of external pressure. To exceed this selected differential—the value of which is primarily determined by structural and economic considerations, and which may vary in different designs—would subject the structure to bursting stresses in excess of those for which it is designed, with possibly permanent structural damage.

In any attempt to control the pressure within such cabins it must be borne in mind that flow-through, or, in other words, ventilation, is an essential consideration. While pressure must be maintained within the range of physical well-being and of reasonable comfort, this alone would not serve to make high-altitude flight practicable. Stale air must be continuously or frequently discharged, and fresh air must be admitted to supply the oxygen which is consumed, in addition to the maintenance of adequate pressure.

Likewise, rate of flow is an important consideration. Too low a rate of flow is, of course, a concomitant of lack of adequate ventilation; too high a rate of flow is also undesirable, for it produces drafts.

Inflow and outflow must be properly balanced, and the extent and manner of this balance is dependent upon various factors, including altitude and absolute cabin pressure, and the rate of flow through the cabin. The inflow rate must not be so rapid at low or medium altitudes that outflow and flow-through, or ventilation, are at such high rates as to be objectionable, yet the inflow rate must be sufficiently high at high altitudes to supply adequate amounts of the comparatively rarefied air to maintain adequate cabin pressure. This implies variable control or regulation of the inflow rate. The outflow rate likewise must be variably controlled, for a relatively high outflow rate is necessary at low altitudes to avoid supercharging, but the outflow rate must progressively decrease with increase of altitude through the medium altitude range, and thereafter the rate of outflow may increase somewhat throughout the range of operation at the limiting differential of pressure. It is clear that the inflow rate must be controlled, and that the outflow rate also must be controlled. Either in their design or by some interconnection the controls of outflow and of inflow must be coordinated and balanced under all conditions. In the present arrangement the two are physically and functionally interconnected, yet it must be remembered that this is only one way of accomplishing the necessary balance, and that other ways of balancing or of operating these controls are not outside the scope nor the spirit of this invention.

Rate of change of pressure is also important to the comfort of a passenger. The effects of too rapid a rate of change are well-known to air travelers, and custom or regulations prescribe the maximum rate of ascent and descent of passenger-carrying airplanes. It is immaterial how slowly the pressure is changed, unless, by lagging behind the actual rate of change of external pressure the cabin pressure may equal or tend to exceed the selected differential. In such a case it is imperative that suitable controls automatically prevent exceeding such differential.

It is known that, if the rate of flow is properly controlled, so that it is not excessive nor yet too slow for adequate ventilation, and if the rate of pressure change is controlled so that it is not so rapid that passengers will be unable to adjust themselves to it, pressures appreciably lower than sea level pressure can be borne without noticeable effects—within certain limits, of course.

The present invention relates to the control of pressures within such a cabin in a manner to produce the minimum of deleterious physiological effects; to protect the structure against excessive internal, outwardly directed stresses, or any external inwardly directed stresses; to the end that the total weight and cost of the airplane may be kept to a minimum, to insure adequate ventilation, yet to control the rate of flow, both into and from the cabin, and the rate of change of pressure, as necessary; to counteract the effect of leakage from the cabin or of failure of the supercharging system; to provide adequate automatic controls for the inlet and discharge of air, and to balance the inlet and outlet flow controls one with the other; to provide automatic indicating or operating mechanisms, as a result of the operation of which the system is adjusted to fit conditions present or immediately to be encountered; to lessen the likelihood of failure of the system due to ice formation, to conserve to the greatest degree heat within the cabin when needed; and to provide a system whereby temperature conditions within the cabin will automatically be maintained substantially constant regardless of low external temperatures, particularly noticeable at high altitudes. By "cabin" is meant any habitable space within an aircraft, or any like space which must be kept at an elevated pressure to prevent damage to contained persons or objects. In certain military aircraft a "cabin" may be a mere cell for occupation by a gunner.

Speaking functionally, it is an object to provide a system of the character indicated, and a control mechanism, so arranged that, while maintaining adequate ventilation, the pressure difference between cabin pressure and external pressure may be permitted to increase, primarily by decreasing the cabin pressure in general correspondence with but more slowly than the decreasing external pressure attendant upon an increase in altitude, until the selected differential of cabin pressure in excess of external pressure is reached, whereupon the differential is or may be maintained, but automatically is never permitted to be exceeded, as the external pressure drops, up to the limit of the capacity of the source (usually a supercharger) which supplies air under pressure to the cabin. In its broad aspect, I have provided a combination of ventilating and pressure controlling means, wherein there is means to increase the cabin pressure above external atmospheric or ambient pressure, and a means which automatically, and in all circumstances, prevents this cabin pressure from exceeding a predetermined differential.

In the specific arrangement illustrated, the cabin pressure is permitted to drop generally in accordance with the pressure altitude curve, up to a given altitude; the cabin pressure is then maintained substantially constant, at a value corresponding to that selected altitude, or is permitted to drop by only a small amount, notwithstanding that the aircraft gains in altitude and the external pressure drops materially, until a given pressure differential between the internal and external pressures is reached; the selected pressure differential will thereafter be automatically maintained, as the altitude increases. Thus as the aircraft takes off from a landing field which is at an altitude below the first critical altitude, the cabin pressure will drop in accordance with (though possibly at a value slightly in excess of) the pressure altitude curve of the outside atmosphere, to a selected altitude, then will be maintained nearly constant to a higher altitude, then will be kept at a constant differential above the outside pressure, the absolute pressure dropping continuously but at the same rate as the external pressure drops, until the limit of the capacity of the supercharging system is reached, the system being arranged to give an indication at this point that this limit has been reached. In descending the operation is merely reversed, and the cabin pressure curve retraces itself.

It is an object to provide in such a system pressure-sensitive elements serving to operate the system automatically, but preferably, though not necessarily, to a certain degree under the control of an attendant, one such pressure-sensitive element being subject to absolute pressures, preferably that obtaining within the cabin, and the other, always automatically operable being subject to differential pressures between the interior of the cabin and the outside atmosphere. It is an associated object to arrange the two control elements, such as the absolute-pressure control and the overriding differential-pressure control, respectively, to actuate a common flow-control device, such as the outflow valve, under conditions which require cabin pressure in excess of external pressure. It is also an object to provide servo mechanism in association with the elements mentioned, and in such a system, connected to be controlled by the pressure-sensitive elements referred to above, and in turn controlling such flow-control device, and other similar or associated devices.

It is a further object to provide in such a system inlet and outlet flow valves which will automatically operate to prevent insufficient pressures within the cabin by admitting outside air should the external atmosphere tend to increase over the internal pressure, or by preventing discharge of air to the exterior should the internal pressure drop unduly. The system is also arranged so that it will automatically prevent discharge of air from the cabin in the event of failure of the supercharging system, and it is further so arranged that the cabin may be sealed off manually should the automatic controls fail to function.

Enough has been said to indicate the general purposes of the invention. It will be better understood as this specification progresses, and further objects will be ascertained in the course of the specific description of the system.

My invention comprises the novel system, and the novel parts thereof, and their relative arrangement, as shown in the accompanying drawings in diagrammatic fashion, and as described in this specification and more particularly defined by the claims at the end of the same.

The accompanying drawings are diagrammatic only, and illustrate a typical system as applied to a passenger airplane intended for high altitude travel.

Figure 2 is a general sectional view through the principal control elements of such a system, and Figure 3 is a similar view of a control valve, normally manually operable, on an enlarged scale and in a different position from that shown in Figure 2.

Figure 4 is an elevation of the supercharger and heating arrangement and its controls.

Figure 5 is a diagram of the alarm or signal system.

Figure 6 is a graph of the pressure altitude curves, normal and as attained by the use of my invention.

Figures 1, 7:
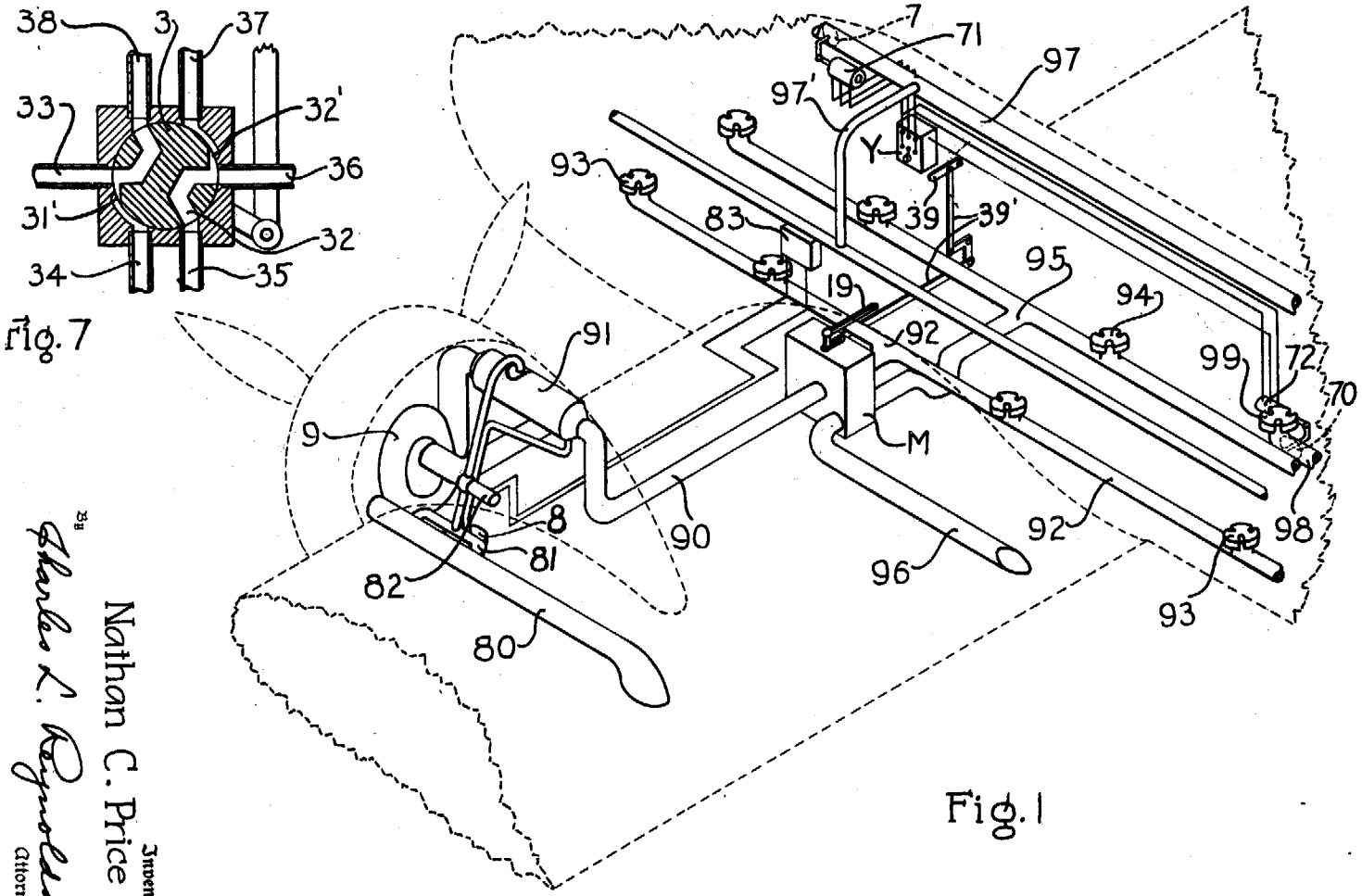
Figure 1 is a perspective view, showing parts of such an airplane cabin, wing and engine nacelle in shadow view, and illustrating the relationship of the parts of the system to each other, and to the airplane.
Figure 7 is a section through the control valve, in a position corresponding to Figure 2, but showing a modified form.

The system as a whole is illustrated in Figure 1. A supercharger 9 is intended to typify any convenient source of air under pressure. As shown, it is connected to the engine, to be continuously driven thereby, and at a rate which is substantially constant. These details, however, are purely illustrative, however, and are not intended to be restrictive. Such a supercharger receives air from a convenient source, as from a scoop or ram properly located in a pressure area, as usual, and delivers this air through a conduit 90 and preferably past a heating arrangement, indicated as taking the form of a condenser, radiator, or heat exchanger 91, through a control device generally indicated by the letter M, and thence through a conduit 92, branched as necessary, to the interior of the cabin of the airplane, registers or outlets 93 being provided in the conduit 92 at convenient points. Air is removed from the cabin through registers 94 and a conduit 95 extending preferably through the control device M, and thence by a conduit 96 to a low pressure area externally of the airplane, as for instance upon the upper surface of the wing near its trailing edge. As an alternative or supplementary supply and discharge system I may provide a conduit 97, the forward end or ram of which is located in a pressure area, for instance at the nose of the cabin, to scoop in or admit air, and to discharge it within the interior of the cabin through outlets (not shown), and air may be discharged from the cabin through a conduit 98, which has registers or inlets 99, and which terminates in a low pressure area, for instance at the tail of the fuselage. Provision may be made for connections from one or the other, or from both, of the supply conduits 92, 97, as for example by the branch 97′ from the conduit 97, to supply air to individual ventilators (not shown) placed adjacent the passenger seats, and adapted to be opened and closed by the passengers as desired, and as is now customary in passenger airplanes.

It will normally be desired to heat the air, at least that which enters from the supercharger, since the atmosphere at appreciable altitudes is likely to be cold, and it will not be sufficiently warmed in many cases by the compression given it by the supercharger. The heating arrangement is separately patented, Patent No. 2,193,141, issued March 12, 1940, and it need only be pointed out here that water is led as needed from a water tank 8 through a boiler 81 disposed within the exhaust stack 80 of an engine (not shown) or is otherwise arranged to be heated, and thus steam may be generated to be supplied to the condenser 91, and the operation of this heating arrangement is under the control of a valve 82 controlled by a thermostat 83 located conveniently, as for instance in the interior of the cabin. Should it be necessary to absorb heat from the compressed air, an intercooler of known type (not shown) may be arranged in known manner in the conduit 90.

Normally the air for the interior of the cabin at low altitudes will be supplied in part through the conduit 97, past a valve 7, and the discharge from the conduit 98 will be controlled by a valve 70. These valves are preferably connected for simultaneous operation, that is to say, both may be opened or both may be closed at one time. For instance, the valve 7 is operable by a solenoid 71 and the valve 70 by a solenoid 72, and these solenoids are controlled manually or automatically by or in accordance with pressure-sensitive devices and alarms, which will be later described in detail. It is sufficient to point out here that up to 8000 feet, for instance, the valves 7 and 70 may be left open, and an alarm is given at this pressure altitude as a signal for an attendant to close these valves, or the alarm-actuating means may automatically close them. There is a further alarm or the same alarm may be used in another circuit, whereby a signal is again given at a considerably greater altitude when the limit of the capacity of the supercharging system is approached.

By reference to Figure 6 it can be seen that the normal pressure altitude curve, shown in dash lines, is one which drops from a point in the vicinity of 30 inches of mercury at sea level to a value in the neighborhood of 12 inches of mercury at 24,000 feet. With the conduits 97 and 98 open at sea level, and from thence up to 8,000 feet (or any similar figure arbitrarily selected), the pressure altitude curve within the cabin will approximately coincide with the external pressure altitude curve, and is shown between points A and B of the graph, Figure 6, in solid lines. The pressure within the cabin may slightly exceed the external pressure for any given altitude because it will be remembered the supercharger is operating continuously, but by a mechanism within the control unit M and to be described hereafter the control unit M, at these altitudes, is arranged to regulate only the rate of flow from the supercharger into the cabin. Between points A and B, the latter approximately 22 inches of mercury, actual supercharging of the cabin is not necessary because normal atmospheric pressures up to 8,000 feet altitude are not physiologically harmful, and, furthermore, it is quite possible that landing fields will be used which are at altitudes up to this figure. Thus between stations A and B the automatic control unit M is so arranged and set that it has no control function except to regulate the rate of flow from the supercharger.

I do not mean to infer that the cabin pressure may not be permitted to drop at a rate less than the rate of external pressure drop: in a copending application, Serial No. 216,028, filed June 27, 1938, I have disclosed how this may be accomplished. In the simple arrangement herein disclosed it is more convenient and understandable to permit the cabin pressure to follow one specific curve, whether it is rising or falling, and this curve nearly, if not quite, coincides with the pressure altitude curve of the external atmosphere, below 8000 feet, that altitude selected to accord with arbitrary design considerations.

Pressures lower than that obtaining at 8,000 feet commence to become uncomfortable and to produce undesirable, if not harmful, physiological effects, especially on passengers unused to such altitudes, and accordingly it is desired to maintain substantially constant pressure from 8,000 feet upward at least within the capacity of the structure to resist internal pressures greater than those outside. Thus between points B and C on the solid line of Figure 6, that is, from about 8,000 feet to about 16,000 feet, the pressure inside the cabin is maintained substantially constant, though the external pressure is continuously decreasing with increase in altitude. There may be some pressure drop between stations B and C, as indicated at X. It is not large from the physiological standpoint, but is sufficient to effect operation of certain control devices within or associated with the unit M.

At the altitude corresponding to point C, here shown at 16,000 feet, a differential pressure exists between the inside and outside pressures, and this differential is so chosen as to be safely within the structural limits of the cabin, but it is not desired to exceed this differential. Accordingly when a cabin pressure corresponding to the point C has been reached, automatically the control unit M is placed in condition to maintain from this point onward, with further increase of altitude, not a uniform cabin pressure but a uniform differential of pressure between the inside and outside, and thus from point C to D, the latter at, for example, 22,000 feet, the differential pressure is maintained constant, although the absolute pressure within the cabin drops. This differential pressure may be, for instance, 2½ pounds to the square inch. Though no alarm is shown, arranged for operation at point C, and none is needed because the system automatically maintains the differential from point C onward, an alarm might be provided, and the change-over from constant-pressure conditions to constant-differential conditions might be manually accomplished by an attendant attracted by such a signal.

Beyond some given point, as the point D, the cabin pressure differential can no longer be maintained with the capacity of the supercharger selected, although, of course, with a supercharger of different capacity the point D will be differently located. The differential begins to decrease, as is shown by a downwardly trending solid curve from D to E. At point E an absolute cabin pressure is reached, which tends to be physiologically detrimental to the occupants of the aircraft, and at this point it is arranged that a signal shall be given to indicate the attainment of this altitude, and the dropping of internal pressure to this point. This signal indicates to the pilot or attendant that the cabin pressure is too low, and that the aircraft should descend or arrangements should be put into effect immediately to supply emergency oxygen. This signal may be supplanted or supplemented by automatically operable means to initiate such oxygen supply.

The above indicates the aims which are attained by the system which will now be described in detail. Pressures and capacities and altitudes are arbitrarily selected, and may be varied at will, all as will be evident to the aircraft engineer, but those selected will be used for purposes of illustration. Also while I shall proceed to describe the control devices in detail, it will be understood that the arrangement described is chosen purely for purposes of illustration, and that various changes may be made in the form, character, and relative arrangement of the parts without departing from the scope of my invention, as defined in the claims.

In the arrangement which I shall proceed to describe and which is shown in Figures 2 and 3, a supercharger supply conduit 90 has in its line an inflow valve 1 which controls the flow from the conduit 90 to the cabin inlet conduit 92. Flow from the cabin is through an outlet 95 and passage 96, past an outflow valve 2. Each of these valves is operable through the medium of a servo piston, the valve 1 being operable by the piston 13 and the valve 2 by the piston 24.

In the arrangement shown the inflow valve 1 is largely controlled or balanced by the outflow valve 2 by flow sensitive devices, which will be described in detail hereafter. It may be pointed out that the outflow valve 2 is controlled primarily and selectively by two pressure-sensitive devices, and that these pressure-sensitive devices operate only upon the outflow valve. One of these pressure-sensitive devices is an absolute-pressure sensitive device, taking the form in the present illustration of the evacuated Sylphon bellows 21, with a spring 21' resisting its collapse. The other pressure-sensitive device is a differential-pressure sensitive device, represented as the Sylphon bellows 4, which, through means that will be described in greater detail, is subject to the pressure difference between the interior of the cabin and the external atmosphere.

The servo pistons 13 and 24 and a further control piston 11, the purpose of which will appear hereafter, are each subject to a pressure difference at their opposite faces, and are sufficiently loosely fitting in their respective cylinders that a measurable amount of leakage is inevitable, is expected, and is depended upon for the proper functioning of the piston, and to maintain equilibrium in each position, between the forces acting at opposite sides of the pistons. Taking the piston 24 as typical, the actuating pressure difference is developed by subjecting its under side to supercharger pressure by way of the passage 25, and by permitting air which leaks past the piston to its upper side to escape, either by way of the passage 26 or the hollow stem 22, to a lower pressure space, and in the present arrangement to the lower pressure of the external atmosphere which obtains at all altitudes. Escape via 26 is controlled by a valve 42, as will appear later. Escape via 22 is controlled by a stem or spindle 27, acting as a valve with relation to the end of the hollow stem 22, and controlled in a manner which will appear more fully later.

If the stem 27 is but slightly removed (say, by a few thousandths of an inch) from the end of the hollow stem 22 (assuming valve 42 to be closed) escape of pressure from above the piston 24 can be so slow as to be at a rate but slightly greater than the rate of leakage past the piston from below. The pressure above the piston is just sufficiently less than the pressure below the piston that the weight of the piston-valve assembly is equalized, and no movement occurs. Parts are then in equilibrium. If now the stem 27 be more greatly removed from the end of the hollow stem 22 escape of pressure to atmosphere through the latter is more rapid than leakage from below the piston. Equilibrium is destroyed and upward movement of the piston occurs. Immediately it moves upwardly it tends to close the space between the upper end of the hollow stem 22 and the stem 27, and the upward movement stops, unless, indeed, the stem 27 continues to move upwardly. On the other hand, if the stem 27 moves closer to the end of the hollow stem 22, escape of pressure from the upper side of the piston is not at as rapid a rate as it can be replaced by leakage from below, and upon approximate equalization of pressure above and below the piston the weight of the piston-valve assembly causes the latter to move downwardly. Immediately, in this case, the downward movement of the upper end of the hollow stem 22 removes it more greatly from the stem 27, low pressure again has access to the upper side of the piston, unless, indeed, the stem 27 continues to move downwardly, and downward movement of the piston valve assembly is stopped in a new position of equilibrium.

The final outlet 96 from the cabin preferably is in heat exchange relationship to the inflow conduit 90. The air in its passage from the conduit 90 to the conduit 92 is led around or adjacent to the cabin outlet 96, thereby to warm the latter, due to the heat of the air heated by compression and flowing to the cabin. In this manner icing conditions are prevented which might tend to clog the cabin outlet 96. On the other hand, if the discharge air should be warmer than the cabin inlet air, which is unlikely, this arrangement tends to absorb any latent heat from the air being discharged, to return it thence to the cabin.

The flow control mechanism centers around a control valve 3, which in the present disclosure is manually operable by the handle 30, but which may be arranged for automatic operation under pressure control, for instance, and around a cabin inlet Venturi throat 10 and a cabin outlet Venturi throat 20, arranged for selective control of the piston 11 through the valve 3. The function of the flow control mechanism is to control the rate of inflow to the cabin at low altitudes primarily under the influence of cabin inlet flow conditions (see Figure 3), and to control inflow at medium altitudes primarily under the influence of cabin outlet flow conditions (see Figure 2).

The control valve 3 is provided with two passages 31 and 32, terminating in four ports, adapted to register with four of six pipes connected to the valve casing. These pipes are numbered 33, 34, 35, 36, 37, and 38. The two alternative positions of the valve 3 are shown by comparison of Figures 2 and 3. The position of the control valve shown in Figure 2 is that assumed for operation at medium altitudes, that is, over 8,000 feet, and movement of the inflow valve 1 is under control of the piston 11, acted upon by outlet flow conditions through the venturi 20, acting through the pipe 38, the valve passage 31, and the pipe 33 upon the under side of the piston 11. Upon its upper side the piston 11 is acted upon by the cabin static pressure communicated through the pipe 35, the valve passage 32, and the pipe 36 to the upper side of the piston.

As has been pointed out, this piston fits loosely within its cylinder so that air gradually leaks past the piston from its higher pressure side to its lower pressure side, tending to equalize such pressures. Movement of the piston in a direction to open the valve is assisted by a coil spring 100. Counterweights 12 may be employed, if required, to prevent motion of the piston under the influence of inertia effects, from heaving or other accelerations of the aircraft in rough air. Counterweights 23 serve a like purpose with relation to the piston 24.

The servo piston 13 is similarly loosely fitting within its cylinder. Its under side is connected through a pipe 14 with the atmosphere, and its upper side is also in communication with the atmosphere through a pipe 15 past a check valve 16. However, provision is made, under most conditions, to afford a certain amount of access of supercharger pressure within the conduit 90 to the upper side of the piston 13. Such access may be had by making the stem 17 of the valve 1 hollow, the stem 17 and its hollow bore terminating at their upper end immediately above the piston 13 and within the cylinder chamber which is above this piston, and at their lower end within the conduit 90. The lower end of the bore is normally closed to a certain degree by a separate stem or spindle 18 which is movable with the piston 11. In addition the valve 1 may be controlled manually for closing in opposition to any and all automatic controls and forces by a handle 19 which functions through a stem 19' bearing upon the upper end of the hollow stem 17. This permits closing of the valve 1 to prevent excessive supply of air into the interior of the cabin in such an emergency as would result from the failure of the flow-sensitive mechanism to function or breakage thereof.

In the position of the control valve 3 which is shown in Figure 3, which represents the position of the valve below 8,000 feet, the lower side of the control piston 11 is in communication with the cabin inlet flow pressure at the throat of the venturi 10 through the pipe 34, the valve passage 31, and the pipe 33, whereas the upper side of the piston 11 is connected through the pipe 37, the valve passage 32, and the pipe 36 with the inlet at the pressure side of the inlet venturi 10, so as to be under the influence of the cabin inflow, which latter primarily controls the piston 11 at this time.

The functioning of the control piston 11 is substantially the same in either position of the parts, that shown in Figure 2 or that shown in Figure 3, and the principal difference is that in the one case the initiation of control is under the influence of cabin outflow (Figure 2), and in the other case (Figure 3) the control is under the influence of cabin inflow. In either case the space above the control piston 11 is connected to a pressure source and the space therebelow is connected to a suction source. The pressure differential thus created acts downwardly, but is balanced by the spring 100. Leakage past the piston is calculated to be just sufficient, under proper operating conditions, to hold the piston 11 and its spindle 18 adjacent, but not quite in contact with (a spacing of a few thousandths of an inch) the lower end of the hollow stem 17, provided the stem 17 and its valve 1 are in the proper position, under the conditions then existing, to balance inflow with outflow. At this spacing supercharger pressure or inlet flow pressure is admitted through the hollow stem 17 at such a rate that by leakage upward to the lower side of piston 13, which is in free communication through 14 with the lower atmospheric pressure, the piston valve assembly 1, 13 is balanced against the forces (largely gravitational) tending to close the valve 1. If the forces acting upon the control piston 11 cause this to move downwardly, more supercharger pressure is admitted through the hollow stem 17, due to separation of the upper end of the spindle 18 from the lower end of the stem 17, and pressure is thereby admitted to the chamber above the servo piston 13 at a rate in excess of the rate at which it can be relieved past the piston, therefore, the piston valve assembly tends to move downwardly, following the downwardly moving spindle 18 until equilibrium is again restored. The reverse is true if the spindle 18 tends to move upwardly. The valve in that case is moved upwardly, due to destruction of the balance of the pressures above and below the servo piston 13.

Like the inlet valve 1, the outlet valve 2 is subject to certain controls, and is moved by a servo device. The evacuated Sylphon 21, which is an absolute pressure-sensitive device, is operable under the influence of the differential between two opposed forces. One such force is the spring 21', tending to lessen the space between the spindle 27 and the upper end of the hollow stem 22, and thereby, through the servo piston 24, tending to close the valve 2. The other such force a variable, is the cabin static pressure tending to collapse the bellows 21 and thereby withdrawing the spindle from the hollow stem 22, and reacting through the servo piston 24 to permit opening of the valve 2. Movement of the valve 2 is also controllable by the differential-pressure sensitive bellows 4, having within it a compression-resisting spring 49, and internally in communication, via pipe 43, with the external atmospheric pressure. This bellows is enclosed within a housing 40, which through a pipe 41 is in communication with the cabin static pressure, so that externally the bellows 4 is under the influence of cabin static pressure tending to compress it, and upon its compression to open the valve 42. The spring 49 is of such strength that opening of the valve 42 does not occur until the selected differential between cabin pressure and external pressure has been reached. Upon opening the valve 42, communication of the space above the servo piston 24 with the external atmosphere is under control of the valve 42, for the hollow stem 22 is closed, at all cabin absolute pressures lower than C, Figure 6, by the spindle 27. Forces developed under differential-pressure control are sufficient to move the spindle 27 upwards, against spring forces urging it downwardly.

The pipe 26 under such conditions admits external atmospheric pressure to the upper side of the servo piston 24 under control effected by the valve 42, under the influence of the differential-pressure sensitive device 4. Externally, then, the bellows 4 is under the influence of cabin static pressure tending to compress it, in opposition to its spring 49, and upon its compression to open the valve 42, and internally the bellows 4 is in communication through a pipe 43 with the outside atmosphere at a pressure below that of the pressure cabin, and a branch 44 of this pipe communicates past the valve 42 with the pipe 26. When the cabin differential pressure tends to exceed the desired maximum, whether from increase of absolute cabin pressure or from drop in the external atmospheric pressure, the bellows and spring yield and compress, allowing the valve 42 to be raised from its seat. When this occurs the pressure differential at the opposite sides of the servo piston 24 is destroyed, as has already been explained, and corresponding opening movement of the valve 2 automatically occurs, relieving any excess of pressure. If cabin differential pressure tends to drop below the set value, a reverse action occurs, the valve 2 moves towards its seat, and the desired differential is restored automatically.

In addition to or in conjunction with the control devices just described, and which are generally indicated in Figure 1 at M, there are barometric control or indicating devices within the cabin and subject to the pressure therein, shown in detail in Figure 5, and in Figure 1 at Y. It has already been noted that the inlet valve 7 and outlet valve 70 in the open or rammed air supply and discharge lines, respectively, are controllable under the influence of the respective doubly wound solenoids 71 and 72. There is provided, as part of the control at Y, a pressure-sensitive Sylphon 5 which is so arranged as to close the gap between terminals 51 in an electric circuit when a pressure altitude within the cabin is reached which corresponds to 8,000 feet, provided that a switch 52 in the circuit is properly closed, that is, is in contact with terminal 57 in the full line position shown in Figure 5. This is the normal position of the switch arm up to 8,000 feet. At 8,000 feet it is desirable to close the valve 7 and 70, and to throw the control device M into operation to maintain constant pressure between the points B and C of the graph Figure 6. Accordingly, upon energization of the signal 54, an attendant throws the switch arm 52 into contact with the terminal 53. This signal or alarm 54, for instance a light, is energized when the pressure-sensitive element 5 closes the gap between the terminals 51, one of which connects with the terminal 57, thereby completing a circuit through the alarm or signal light 54. When the attendant throws the switch 52 into contact with the terminal 53, the solenoids are so energized as to close the valves 7 and 70, and the switch 52 may be so connected that it throws an arm 39, connected to the control valve 3, into such position as to move the control valve 3 into the position of Figure 2. To this end the arms 52 and 39 may be both secured to a common rock shaft, as shown in Figure 5. It may be noted here that in order to open the valves 7 and 70 it is only necessary to throw the switch 52 into contact with the terminal 55, and this motion will turn the control valve 3 into the position of Figure 3.

After the switch handle 52 has been thrown into contact with the terminal 53, and the valves 7 and 70 have been closed, if it is thrown to a neutral position the signal light 54 is no longer illuminated. Such a neutral position may be intermediate the terminals 53 and 57. However, a second pressure device 50, similar to the element 5, is part of the control device Y, within the cabin, the element 50, however, being arranged to close a circuit through the terminals 56 when the pressure altitude reaches 16,000 feet. This is not the actual altitude, the latter being considerably higher, say 24,000 feet, but since the element 50 is within the cabin it is arranged to operate, regardless of the position of the switch arm 52, when the cabin pressure corresponds to the external pressure at 16,000 feet. This again closes a circuit through the signal light 54, indicating that the point E has been reached, and that the pressure has fallen to a point where additional oxygen should be supplied. The element 50 might instead be arranged to close the circuit at the point C, or at the point D on the graph, Figure 6, or there may be several such elements operable at different pressure altitudes. It will be borne in mind that the light 54 is an example of an electrically energizable device which is energizable at selected pressure altitudes by the different pressure-responsive means, and it may as well indicate automatic means to effect movement of valves or control devices, or auxiliary oxygen supply devices, although it is considered preferable to merely signal these conditions to an attendant who may effect proper action.

The operation of the system will be best understood by following through a typical series of actions. As previously noted, from points A to B of the graph cabin supercharging is not occurring, because the valves 7 and 70 are open to equalize internal and external pressures, since normal atmospheric pressures up to 6,000, 7,000 or 8,000 feet are not physiologically harmful or discomforting to passengers. The control valve 3, in the position of Figure 3, controls the rate of flow from the supercharger into the cabin, under the influence of the inlet venturi 10. From point B to point C, where the cabin pressure is maintained substantially constant, the valve 3 is in the position of Figure 2 and the cabin supercharging control device M regulates the rate of flow from the blower into the cabin, under the influence of the outlet venturi 20.

With the control valve in the position of Figure 3 the upper side of the piston 11 is subjected to inlet pressure through the pipe 37. Any decrease in pressure effected by increased flow past the Venturi meter 10 is carried through the valve 3 to act upon the lower side of the piston 11, evacuating the lower portion of its cylinder faster than air can leak thereinto, past the loose piston from the high pressure side, thus tending to move the control piston 11 downwardly. Accordingly any tendency for increase in inlet flow will cause the piston to be deflected downwardly, acting as previously described to close the inlet valve 1, and thereby to reduce the rate of inflow. A decrease in flow through the venturi 10 will cause the piston 11 to move in the opposite or upward direction under force of the spring 100, opening the valve 1. Therefore, from A to B, constant dynamic flow is provided at the cabin inlet from the supercharger, regardless of the speed of the impeller of the latter. Instead of controlling rate of inflow, the same or similar controls might vary the speed of the supercharger, to the same end.

Dependent upon particular weather conditions the inlet valve 7 and outlet valve 70 controlling the open or rammed inlet and discharge, may be either opened or closed. Let us assume that these valves are both open to some degree, according to the requirements of the passengers. When point B is reached the pressure-sensitive element 5 energizes the alarm or signal 54, indicating to the attendant that cabin supercharging should be started. Accordingly the switch handle 52 is moved manually (or automatically, as suggested above) from terminal 57 to terminal 53, to cause closure of the valves 7 and 70, breaking the circuit through the light 54, and as the switch handle approaches the end of such movement its motion is transmitted through the levers 39 and 30 and linkage 39′ to the control valve 3, to reverse the latter's position. For control purposes this throws the sensitivity to the flow previously under the influence of the inlet venturi 10, to the outlet venturi 20. The valve is now in the position of Figure 2. Accordingly the cabin inlet valve 1 is regulated in the same fashion as previously described, but under the control of the outlet venturi.

At point B in the graph, which we have now reached, the pressure of the external atmosphere, which is substantially the same as the pressure within the cabin, is no longer sufficient to hold the absolute pressure-sensitive Sylphon 21 collapsed to its limit, for the collapsing force has decreased, while the opposing spring force has remained unchanged, and the Sylphon commences to expand due to pressure from the spring 21′ within it. The degree of this expansion is abrupt, and dependent upon the pressure drop X from point B to point C. This pressure drop X is not large from the physiological standpoint, but is sufficient to cause complete expansion of the Sylphon 21, and consequent complete closure of the outlet valve 2. As previously pointed out, the actual force for the movement of the valve 2 is not supplied directly by the stem 27, movable with the Sylphon 21, but by the servo piston 24. Thus starting at point B of the graph, if for any reason the cabin pressure tends to drop, the Sylphon 21 will expand under the influence of spring 21′ and will act through the servo mechanism to close the outlet valve 2. Any tendency for the pressure in the cabin to increase from the point B upward will reverse the process, such excess pressure overriding the resistance of the spring 21′.

Occurrence of a leak in the cabin will tend to cause a drop in cabin pressure. The small increment of drop causes a relatively large degree of closure of the cabin outlet valve 2; consequently there is a tendency for the flow to be abruptly reduced through the outlet 96. The consequent reduction of flow in the oulet venturi 20 brings the inlet valve servo mechanism to a new position of equilibrium, providing a greater and compensating flow past the inlet valve 1. Accordingly even a very large leak in the cabin will cause a negligible drop in cabin pressure, and an appropriately increased supply of air from the cabin supercharger to resist any drop in the cabin pressure. The supercharger is allowed to overload during the presence of such conditions.

At point C of the graph a cabin supercharging condition is reached such that for structural reasons it is not desirable to further increase the differential pressure between the cabin and the atmosphere. Accordingly the differential pressure responsive element 4 is so arranged that it commences to compress under the differential between the higher cabin static pressure, to which it is subjected exteriorly, and the lesser atmospheric pressure to which it is subjected internally. Compression of the element 4 admits atmospheric pressure past the valve 42 to the upper side of the discharge valve servo piston 24. This causes automatically opening of the discharge valve against the will of the absolute pressure responsive Sylphon 21, in effect overriding the latter, and thus from point C to point D of the graph, and without any action by the attendant, a cabin differential pressure of, for example, 2½ pounds per square inch, is maintained. The rate of flow to the cabin under control of the outlet venturi 20 may still remain constant, for as the outlet valve 2 opens, tending to increase the outflow, the inlet valve will tend to open. The two automatically maintain their balance. At point D of the graph the limit of the supply characteristic of the supercharger is reached, and it cannot maintain any longer the desired pressure differential in the cabin, and the cabin inlet valve 1 is then fully open. Beyond point D the 2½ pound cabin pressure differential can no longer be maintained, and the differential tends to decrease. At point E of the graph a cabin pressure is reached which is physiologically detrimental to occupants of the cabin. This, through the pressure-sensitive element 50 or a similar element, causes energization of the alarm or signal 54, and this is the signal to the attendant that the pressure of the cabin is too low, and that either the aircraft should descend or the emergency oxygen supply should be put into use.

It is to be remembered that the operation represented by the graph, Figure 6, is not the only manner in which the control may operate. By suitable design or adjustment of the absolute-pressure sensitive unit, or its spring 21', the location of the point B (that is, the altitude at which supercharging commences) can be altered; if the spring is made sufficiently strong, supercharging can commence at sea level; with a weaker spring supercharging begins at a higher altitude. In similar fashion, by suitable design or adjustment of the differential-pressure sensitive unit, or its spring 49, the location of the point C can be altered; for instance, with a stronger spring a greater differential must exist before the valve 42 is lifted from its seat, and this has the effect of shifting the line C—D—E farther from the approximate atmospheric line A—B, extended.

Since supercharging, as shown above, can commence at any selected altitude or external pressure, and since the absolute value thereof is, in effect, dependent upon the strength of a spring, it is possible to vary that value during ascent, at a rate which may be related to time, or alternatively to rate of change of external pressure, by a progressive adjustment. Always the cabin pressure bears a predetermined relation to external pressure, whether that relation be equality, A to B, whether the one exceeds the other by a given increment, C to D, or whether the one changes at a rate which is a given ratio to the rate of change of the other, B to C. These relationships, therefore, are each susceptible to change, and such change can be continuous during flight.

For instance, knowing the intended time rate of ascent and consequently the intended time rate of atmospheric pressure drop, the adjustment of the force of the spring 21' can be made at a related time rate. This would have the effect of increasing the cabin pressure difference over atmospheric pressure for each time unit (minute) of ascent, and the curve would trend upward away from A—B. It would be a steady divergence if the actual rate of climb coincides with the intended rate of climb. Instead of effecting such adjustment under the influence of a time factor, it could be effected under the influence of a pressure factor, such as a rate-of-climb element, and then, if the actual rate of climb did not follow the intended rate, the increase of the cabin's pressure difference over atmospheric pressure would actually occur at a rate corresponding to actual change of altitude. The curve would then trend steadily away from the atmospheric curve A—B, and the ratio of cabin pressure difference over atmospheric, to total atmospheric pressure change from sea level, or from some other selected datum, could be the same at all altitudes. Of course, the selected limiting differential, controlled by 4, is never exceeded.

It is also the function of the alarm system of Figure 5 to warn the attendant if the supercharging system is not working properly between points C and D. Thus if a leak of very large proportions should have developed in the skin of the aircraft the warning would be given, since the pressure differential would not be maintained. Also any mechanical difficulty in the supercharging or control system resulting in a reduction of cabin pressure below a 16,000 foot pressure altitude would be indicated.

Other conditions in the nature of emergencies may be similarly indicated by the same or other signal devices. For instance, an excessive or insufficient rate of air supply or excessive cabin pressure might be similarly indicated.

During supercharged operation from point B of the graph on through points C and D provision is also made in the control unit for prevention of loss of air from the cabin in the case of complete failure of the supercharger or of the supercharger supply conduit 90. Should any such conditions occur, the inlet valve 1 is returned to its seat by the dynamic effect of reversal of flow at the inlet. The cabin pressure at such a time is in excess of the atmospheric pressure and tends to flow outward past the valve 1 and through the conduit 90, and this tendency to outflow closes the valve 1. Under this condition of reversed flow tendency past the valve 1, outlet valve 2 conditions will be such that the stem 18 will be allowed to close the hole in the stem 17 eliminating differential pressure across the piston 13, again by reason of leakage around and past this piston. The check valve 16 further insures that the pressure above the piston 13 will not be brought to a lesser value than that below the piston 13, which latter condition would tend to cause opening of the valve 1 during reversal of flow past it. The same is true as to the outlet valve 2, since the supercharger pressure through 25 is no longer available to resist its closing. Furthermore, the valve 1 may be forcibly closed by the manual lever 19, in the event of failure of the supercharger or to prevent any excessive cabin pressure resulting from malfunctioning of the control unit.

Both the inlet and outlet valves 1 and 2 are also capable of acting as inlet relief valves. Thus if the aircraft had been operating in the region indicated by point D, and were suddenly brought to a lower altitude it would not be possible for the atmospheric pressure to exceed that of the cabin, for this excessive atmospheric pressure would merely force open the valves 1 and 2, thereby equalizing the pressure within the cabin and that outside it. This would occur even though the supercharger or the pressure-sensitive mechanism in the control unit had become inoperative.

A further modification of the control valve 3 is preferable in some instances, as when the blower or such other cabin air supply device is particularly changeable in discharge pressure or is very unstable. This would be offensive in a comparatively large pressure cabin since, during operation from points B to D in Figure 6 while the average cabin inflow and outflow might be kept very constant, there might still be rather small flow variations of relatively high frequency permitted at the cabin inlet, falling above and below the average inlet flow value.

I prefer, therefore, to temper the flow control in such cases, between points B and D, by allowing the inflow metering system to slightly influence the position of the valve 1, while the predominant influence is still derived from the outflow metering system, and all the herein described beneficial results of a flow sensitivity by an outflow meter are still substantially retained.

One method of tempering is, for instance, produced by slightly trimming off the corners of the valve 3 as indicated at 31' and at 32'. This allows passage 34 to be slightly exposed to passage 33, and passage 37 to be slightly exposed to passage 36 during the position of valve 3 indicated in Figure 7, which corresponds to its position in Figure 2. High frequency flow fluctuations past the valve 1 are thereby prevented during supercharging of the cabin by the damping action of the inlet venturi control.

It is to be understood that I do not limit myself to the particular forms or devices described in the preceding specification. Thus pressure sensitivity to effect a pressure control with my system might be derived from any equivalent pressure-sensitive device, as a flexible vapor pressure container having a volatile liquid therein at a constant temperature, for instance. Nor are the flow sensitive devices limited to venturis. Hot wire electrical flow meters and various other species of flow meters are recognized equivalents, and are properly adaptable to the control mechanisms described. By the use of the above mentioned volatile liquid as a basis of pressure control, or hot wire flow meter as a flow control, the type of pressure and flow regulations may be made to vary systematically with atmospheric temperature, or cabin temperature. Thus during usually high atmospheric temperatures at high altitudes which might, together with the temperature rise of air compression, cause uncomfortable cabin temperatures, the flow of air might be reduced to minimize the rate of heat contribution to the cabin and to reduce the cabin temperature. At the lower altitudes, however, the flow may be advantageously increased during hot weather for maximum passenger comfort, because the heat of compression is relatively small at this time and the cabin temperature will be reduced by increased air flow within certain limits.

While I have referred to the passenger cabin as the space or enclosure within which the pressure is regulated, implying by that term the space, usually within the fuselage, occupied by passengers or crew, and while it is to such a cabin that the invention is primarily applicable the term is also to be understood as meaning any enclosed space of an aircraft wherein, for any reason, it is necessary or desirable to maintain given pressure conditions.

What I claim as my invention is:

1. Mechanism to control aircraft cabin pressures, comprising, in combination with means to supply air under pressure to the cabin, a pressure regulating means, absolute-pressure responsive means operatively connected to the pressure-regulating means, and automatically operable thereupon to maintain cabin pressures substantially constant, up to a selected differential of cabin pressure above external pressure, and differential-pressure responsive means also operatively connected to the pressure-regulating means, and automatically operable thereupon to prevent exceeding such differential for all lower external pressures.

2. Mechanism to control aircraft cabin pressures, comprising, in combination, means to supply air under pressure within the cabin, valve means movable to regulate the cabin pressure, absolute-pressure responsive means operatively connected to the valve means, and automatically operable to maintain cabin pressures substantially constant, up to a selected differential of cabin pressure above external pressure, and differential-pressure responsive means also operatively connected to said valve means, and arranged to override automatically the absolute-pressure responsive means, during the prevalence of conditions tending to cause such selected differential to be exceeded, said differential-pressure responsive means being automatically operable, so long as such differential tends to be exceeded, to maintain such differential of cabin pressure above external pressure, within the capacity of the pressure source.

3. Mechanism to control aircraft cabin pressures, comprising, in combination with means to supply air under pressure to the cabin, and an outlet to discharge air from the cabin, two interconnected valve means operable the one to govern air movement through and the other to govern pressure within the cabin, means operable primarily under the influence of cabin outflow pressure to operate said interconnected valve means to maintain a substantially constant cabin pressure, means operable automatically upon the attainment of a selected differential of cabin pressure above external atmospheric pressure to operate said interconnected valve means to maintain such differential during the prevalence of lower external pressures tending to increase the differential.

4. Mechanism to control aircraft cabin pressures, comprising, in combination with a supercharger connected to supply air to the cabin, and an outlet to discharge air from the cabin, a valve controlling inlet from the supercharger, a valve controlling outflow from the cabin, means operable primarily under the influence of inlet flow pressure to differentially operate said valves to maintain a substantially constant rate of flow through the cabin throughout a given altitude range, means operable primarily as a function of cabin outflow pressure to differentially operate said valves to maintain a substantially constant cabin pressure throughout a higher altitude range, and means to selectively render operable one or the other of said latter two means.

5. Mechanism to control aircraft cabin pressures, comprising, in combination with a supercharger connected to supply air to the cabin, and an outlet to discharge air from the cabin, a valve controlling inlet from the supercharger, a valve controlling outflow from the cabin, means operable primarily under the influence of inlet flow pressure to differentially operate said valves to maintain a substantially constant rate of flow through the cabin throughout a given altitude range, means operable primarily as a function of cabin outflow pressure to differentially operate said valves to maintain a substantially constant cabin pressure throughout a higher altitude range, means to selectively render operable one or the other of said latter two means, and means operable under the influence of an attained differential of cabin pressure above external pressure to differentially operate said valves to maintain such differential throughout a still higher altitude range.

6. Mechanism to control aircraft cabin pressures, comprising, in combination with a supercharger connected to supply air within the cabin, and an outlet to discharge air from the cabin, valve means operable to control such supply and discharge, means operable primarily as a function of inlet flow pressure to control such valve means to maintain a constant rate of flow through the cabin throughout a low altitude range, means responsive to a given pressure altitude to signal the attainment of the upper limit of such altitude range, means operable as a result of the operation of the preceding means to alter the manner of control of the valve means, means thereafter operable primarily as a function of cabin outflow pressure to maintain a substantially constant cabin pressure throughout a medium altitude range, means operable in response to a given differential of cabin pressure over external pressure to override the preceding means and to control said valve means to substantially maintain such differential throughout a high altitude range, and signal means responsive to a given pressure altitude to indicate the attainment of a selected minimum cabin pressure.

7. Mechanism to control aircraft cabin pressures, comprising, in combination with a supercharger connected to supply air within the cabin, and an outlet to discharge air from the cabin, an inlet valve and an outlet valve separately operable, pressure sensitive means to effect movement of such inlet valve, a control valve operable, in one position, to subject said pressure sensitive means primarily to the influence of inlet flow pressure, thereby to move the inlet valve to effect a substantially constant rate of flow through the cabin, and operable, in another position, to subject said pressure sensitive means primarily to the influence of outlet flow pressure, thereby to move the inlet valve to tend to maintain constant pressure within the cabin.

8. Mechanism to control aircraft cabin pressures, comprising, in combination with a supercharger connected to supply air within the cabin, and an outlet to discharge air from the cabin, an inlet valve and an outlet valve separately operable, pressure sensitive means to effect movement of such inlet valve, a control valve operable, in one position, to subject said pressure sensitive means primarily to the influence of inlet flow pressure, thereby to move the inlet valve to effect a substantially constant rate of flow through the cabin, and operable, in another position, to subject said pressure sensitive means primarily to the influence of outlet flow pressure, thereby to move the inlet valve to tend to maintain constant pressure within the cabin, pressure sensitive means governing the operation of said outlet valve, and an absolute pressure sensitive means connected and arranged to close said outlet valve with decrease of cabin pressure, thereby tending to maintain constant cabin pressure.

9. Mechanism to control aircraft cabin pressures, comprising, in combination with a supercharger connected to supply air within the cabin, and an outlet to discharge air from the cabin, an inlet valve and an outlet valve separately operable, pressure sensitive means to effect movement of such inlet valve, a control valve operable, in one position, to subject said pressure sensitive means primarily to the influence of inlet flow pressure, thereby to move the inlet valve to effect a substantially constant rate of flow through the cabin, and operable, in another position, to subject said pressure sensitive means primarily to the influence of outlet flow pressure, thereby to move the inlet valve to tend to maintain constant pressure within the cabin, pressure sensitive means governing the operation of said outlet valve, an absolute pressure sensitive means tending to close said outlet valve with decrease of cabin pressure, thereby tending to maintain constant cabin pressure, and a further pressure sensitive device operable as a function of pressure differences between cabin pressure and atmospheric pressure, operatively connected to override the preceding absolute pressure sensitive means, and to effect movement of the outlet valve to maintain a substantially constant selected differential pressure within the cabin.

10. Mechanism to control aircraft cabin pressures, comprising, in combination with means to supply air under pressure within the cabin, and an outlet to dicharge air from the cabin, valve means controlling such inflow and outflow, an absolute pressure sensitive device operatively connected to control the valve means, and operable under the influence of a pressure drop within the cabin, through a selected critical range, to restrict the outflow, means operable primarily under the influence of outflow pressure to operate said valve means to maintain a nearly constant pressure, within the region of such critical range, and terminating at the lower limit thereof upon the attainment of a selected differential of cabin pressure over external pressure, and differential pressure sensitive means operatively connected to control said valve means, to permit outflow and to maintain the selected differential pressure automatically at higher altitudes.

11. Mechanism to control aircraft cabin pressures, comprising, in combination with means to supply air under pressure within the cabin, and an outlet to discharge air from the cabin, an inlet valve and an outlet valve arranged to be self-closing upon failure of inflow pressure, and to be self-opening upon subjection to external pressure exceeding the cabin pressure, and means, including both an absolute-pressure sensitive means and a differential-pressure sensitive means, both operatively connected to said valves to control them to attain a cabin pressure exceeding the external pressure.

12. Mechanism to control aircraft cabin pressures, comprising, in combination with a supercharger connected to supply air within the cabin, and an outlet to discharge air from the cabin, an inlet valve and an outlet valve arranged to be self-losing upon failure of inflow pressure, and to be self-opening upon subjection to external pressure exceeding the cabin pressure, means operable primarily in accordance with outlet flow pressure to control the inlet valve, whereby upon cessation of outflow the inlet valve will close automatically, and pressure sensitive means to control said outlet valve to attain and maintain cabin pressures in excess of the external pressures.

13. Mechanism to control aircraft cabin pressures, comprising, in combination with a supercharger connected to supply air within the cabin, and an outlet to discharge air from the cabin, an inlet valve and an outlet valve arranged to be self-closing upon failure of inflow pressure, and to be self-opening upon subjection to external pressure exceeding the cabin pressure, means operable primarily in accordance with outlet flow pressure to control the inlet valve, whereby upon cessation of outflow the inlet valve will close automatically, and two pressure sensitive means operatively connected to control said outlet valve, one being sensitive to absolute pressures to maintain a substantially constant cabin pressure throughout a medium altitude range, and at the lower pressure limit of such range closing the outlet valve, and the other being sensitive to the differential of cabin pressure over external pressure then attained, to maintain such differential throughout a higher altitude range.

14. Mechanism to control aircraft cabin pressures, comprising, in combination with an inlet to the cabin from a source of warm air under pressure, and an outlet to discharge air from the cabin, valve means controlling such inlet and outlet, and the inlet and the outlet being disposed one surrounding the other, for transference of heat to the outlet, in the vicinity of the valve means, to prevent ice formation.

15. Mechanism to control aircraft cabin pressures, comprising, in combination with a supercharger connected to supply air to the cabin, and an outlet to discharge air from the cabin, a venturi interposed between the supercharger and the cabin, an inlet valve between the supercharger and said venturi, a second venturi between the cabin and the outlet, an outlet valve between the latter venturi and the outlet, means operatively connected to the inlet valve to move the same in accordance with a flow pressure through one or the other of said venturis, means selectively operable to connect at will the inlet venturi or the outlet venturi for control of said inlet valve, and pressure sensitive means to control said outlet valve.

16. Mechanism to control aircraft cabin pressures, comprising, in combination with a supercharger connected to supply air to the cabin, and an outlet to discharge air from the cabin, a flow sensitive device disposed in the supply connection and a second flow sensitive device disposed in the outlet, valve means controlling inflow and outflow, and means selectively operable to control said valve means under the influence of said first flow sensitive means, tending to maintain a constant rate of inflow, or under the influence of the second flow sensitive means, tending to maintain a constant cabin pressure.

17. Mechanism to control aircraft cabin pressures, comprising, in combination with a supercharger connected to supply air to the cabin, and an outlet to discharge air from the cabin, a flow sensitive device disposed in the supply connection and a second flow sensitive device disposed in the outlet, valve means controlling inflow and outflow, means selectively operable to control said valve means under the influence of said first flow sensitive means, tending to maintain a constant rate of inflow, or under the influence of the second flow sensitive means, tending to maintain a constant cabin pressure, and pressure sensitive means operable under the influence of an attained differential of cabin pressure over atmospheric pressure, and further operable, upon the attainment of such differential, to control said valve means, tending to maintain such differential.

18. Mechanism to control aircraft cabin pressures, comprising, in combination with a supercharger connected to supply air to the cabin, and an outlet to discharge air from the cabin, a venturi interposed between the supercharger and the cabin, an inlet valve between the supercharger and said venturi, a second venturi between the cabin and the outlet, an outlet valve between the latter venturi and the outlet, a control piston and a servo piston operatively connected to the inlet valve, a control valve having two passages and movable between two positions, its casing having two ports connected above and below the control piston, respectively, with which the passages connect in either position, and having four additional ports, with two of which the passages connect in one position, and connecting respectively to the inlet venturi flow pressure and to the supercharger static pressure, and with the other two of which the passages connect in the other position and connecting respectively to the outlet venturi flow pressure and to the interior of the cabin, whereby, in the first position the control piston and the inlet valve are operable under control of inflow to maintain a constant rate of flow, and in the second position are operable under control of outflow to tend to maintain a selected cabin pressure, and pressure sensitive means to control said outlet valve, operable upon the attainment of a given pressure altitude to tend to maintain the same.

19. Mechanism to control aircraft cabin pressures, comprising, in combination with a supercharger connected to supply air to the cabin, and an outlet to discharge air from the cabin, a venturi interposed between the supercharger and the cabin, an inlet valve between the supercharger and said venturi, a second venturi between the cabin and the outlet, an outlet valve between the latter venturi and the outlet, means operatively connected to the inlet valve to move the same in accordance with a flow pressure through one or the other of said venturis, means selectively operable to connect at will the inlet venturi or the outlet venturi for control of said inlet valve, a pressure sensitive element and a servo piston operatively connected to control said outlet valve, a conduit leading supercharger static pressure to one side of said servo piston, tending to move it in a direction to open said outlet valve, a hollow stem movable with the valve and piston, and adapted to connect its opposite side to the atmosphere, whereby to control said valve as a function of the differential between atmospheric and supercharger pressures, the pressure sensitive element being subjected to cabin static pressure tending to collapse it in a direction to permit opening of the valve, and a stem movable in response to movement of the pressure sensitive element, disposed to close the hollow stem as the servo piston and valve move towards open position, and to effect closing of the valve as the pressure sensitive element expands, thereby tending to maintain a constant pressure within the cabin.

20. Mechanism to control aircraft cabin pressures, comprising, in combination with a supercharger connected to supply air to the cabin, and an outlet to discharge air from the cabin, a venturi interposed between the supercharger and the cabin, an inlet valve between the supercharger and said venturi, a second venturi between the cabin and the outlet, an outlet valve between the latter venturi and the outlet, means operatively connected to the inlet valve to move the same in accordance with a flow pressure through one or the other of said venturis, means selectively operable to connect at will the inlet venturi or the outlet venturi for control of said inlet valve, a pressure sensitive element and a servo piston operatively connected to control said outlet valve, a conduit leading supercharger static pressure to one side of said servo piston, tending to move it in a direction to open said outlet valve, a hollow stem movable with the valve and piston, and adapted to connect its opposite side to the atmosphere, whereby to control said valve as a function of the differential between atmospheric and supercharger pressures, the pressure sensitive element being subjected to cabin static pressure tending to collapse it in a direction to permit opening of the valve, a stem movable in response to movement of the pressure sensitive element, disposed to close the hollow stem as the servo piston and valve move towards open position, and to effect closing of the valve as the pressure sensitive eleent expands, thereby tending to maintain a constant pressure within the cabin, a conduit connecting to the atmosphere and leading to the side of the servo piston opposite that which is subjected to the supercharger pressure, a normally closed valve in such conduit, and an element movable in accordance with an attained differential between cabin pressure and atmospheric pressure to open the latter valve, thereby to subject the servo piston to a lowered atmospheric pressure and to move it, in opposition to the first pressure sensitive element, to open the outlet valve under the influence of such differential pressure, and to tend to maintain such differential.

21. The method of controlling aircraft cabin pressures which comprises maintaining a substantially constant cabin pressure, by regulating inflow and outflow under the influence primarily of outflow pressure, through a selected medium altitude range, until a selected differential of cabin pressure over external pressure is attained, and then at higher altitudes maintaining such differential by regulating inflow and outflow under the influence of a differential pressure sensitive device overriding the outflow pressure regulating device.

22. The method of regulating inflow to and outflow from an air craft cabin which comprises maintaining a substantially constant rate of inflow in accordance with inflow pressure, up to a selected altitude, from such altitude to a higher altitude maintaining a substantially constant attained pressure by regulating inflow and outflow primarily in accordance with outflow pressure, until a selected differential of cabin pressure over external pressure is attained, and at higher altitudes maintaining such differential primarily in accordance with such attained differential.

23. In an aircraft, in combination, sustaining wings, a power plant and propellers to sustain flight at high altitudes, a cabin supported by the wings, the structure of said cabin including walls defining an airtight compartment, said walls being of desired but limited structural strength, an air supply conduit admitting to the interior of said compartment, and a port to discharge air therefrom, a pressure source to deliver air under pressure to the cabin through said air supply conduit, means to regulate the supply of pressure air from between said pressure source to the cabin, outlet valve means controlling discharge from the cabin, absolute pressure responsive means automatically operable to control said outlet valve to maintain cabin pressure substantially constant, up to a selected differential of cabin pressure above external pressure, at which differential the limit of strength of the cabin structure, within a selected safety factor, is approached, differential-pressure responsive means operable to control said outlet valve to maintain such differential, within the safety factor, for a lower external pressure, within the capacity of the pressure source, and means to adjust the supply-regulating means in accordance with the setting of the outlet valve, to balance supply with outflow, at the respective pressures.

24. Mechanism to control aircraft cabin pressures, comprising, in combination with means to supply air under pressure within and for discharge from the cabin, means to control the cabin pressure, differential-pressure responsive means always operable to regulate said control means, to prevent the cabin pressure exceeding a selected pressure above the external pressure, and means also operable to regulate said control means to increase the cabin pressure to a value above the external pressure, within the limiting differential fixed by said differential-pressure responsive means.

25. Mechanism to control aircraft cabin pressures, comprising, in combination with means to supply air under pressure within and for discharge from the cabin, means to control the cabin pressure, differential-pressure responsive means operable to regulate said control means, to prevent the cabin pressure exceeding a selected pressure above the external pressure, and means automatically operable at a selected altitude to regulate said control means, and thereby to initiate increase of the cabin pressure to a value above the external pressure, within the limiting differential fixed by said differential-pressure responsive means.

26. Mechanism to control aircraft cabin pressures, comprising, in combination with means to supply air under pressure to and for discharge from the cabin, means to control the cabin pressure, differential-pressure responsive means operable to prevent the cabin pressure exceeding a selected pressure differential above the external pressure, and means automatically operable at a predetermined altitude to regulate said control means, and thereby to initiate a change of cabin pressure relative to external pressure, at a predetermined rate as related to altitude, within the lower limit fixed by the external pressure and the upper limit fixed by said differential-pressure responsive means.

27. Mechanism to control aircraft cabin pressures, comprising, in combination with means to supply air under pressure within the cabin, means to control the cabin pressure, differential-pressure responsive means automatically operable to regulate said control means to prevent cabin pressures from exceeding any selected differential above external pressure, and means automatically operable to regulate said control means, to maintain at all times a substantially constant rate of airflow through the cabin.

28. Mechanism to control aircraft cabin pressures, comprising, in combination with means to supply air under pressure to the cabin, and an outlet to discharge air from the cabin, valve means operable to govern air movement through and pressure within the cabin, automatic control means to operate said valve means to maintain a substantially constant cabin pressure, a second automatic control means operable automatically upon the attainment of a selected differential of cabin pressure above extenal atmospheric pressure to operate said valve means to maintain such differential during the prevalence of lower external pressures tending to increase the differential.

29. Mechanism to control aircraft cabin pressures, comprising in combination with means to supply air under pressure to the cabin, a discharge valve continually open for discharge of air from the cabin, differential-pressure responsive means operable to control said valve to prevent exceeding a given cabin pressure differential over external pressures, and absolute-pressure responsive means automatically operable, inside such differential, likewise to control said valve to maintain cabin pressures substantially constant.

30. Mechanism to control aircraft cabin pressures, comprising, in combination with means to supply air under pressure to the cabin, means to regulate air-flow through the cabin, absolute-pressure responsive means operable to regulate said flow-regulating means to maintain cabin pressures substantially constant, up to a selected differential of cabin pressure above external pressure, differential-pressure responsive means operable to regulate said flow-regulating means to prevent exceeding such differential for all lower external pressures, and means operable to regulate said flow-regulating means to maintain at all times a substantially constant rate of air flow through the cabin.

31. The method of controlling aircraft cabin pressures which comprises regulating both the supply of air to and its discharge from the cabin, under the influence of the differential of cabin pressure over external pressure, to automatically prevent such differential exceeding a selected value, and regulating both the supply of air to and its discharge from the cabin to attain a selected cabin pressure which is not in excess of the selected differential value.

32. Mechanism for controlling the pressure within an aircraft cabin, comprising a valve for controlling the flow of air through such cabin, operating means for said valve, said operating means communicating with external atmospheric pressure, and means operable to regulate such communication of said operating means with the external atmospheric pressure, thereby to govern the cabin pressure.

33. Mechanism for controlling the pressure within an aircraft cabin, comprising a valve for controlling the flow of air through such cabin, operating means for said valve, said operating means being actuated by communication with external atmospheric pressure, and means responsive to cabin interior pressure operable to regulate such communication of said operating means with the external atmospheric pressure, thereby to govern the cabin pressure.

34. Mechanism to control aircraft cabin pressures comprising, in combination, means to supply air under pressure to the cabin, an outlet from the cabin normally open for continuous outflow at all altitudes, means controlling the airflow through the cabin to prevent the cabin pressure from exceeding a selected pressure above external pressure, and means to increase the cabin pressure to a value above the external pressure but not greater than the limiting differential determined by said second-named means.

35. Mechanism to control aircraft cabin pressures comprising, in combination with an outflow opening and with means to deliver air under pressure within the cabin at a rate in excess of that necessary to maintain a given pressure within the cabin, flow-control means, absolute-pressure responsive means automatically operable to regulate said flow-control means to increase cabin pressures to values above external pressure, up to a selected differential of cabin pressure above external pressure, while at the same time permitting continuous outflow through the outflow opening, and differential-pressure responsive means also operable to regulate said flow-control means to prevent exceeding such differential for all lower external pressures.

36. Mechanism for controlling the pressure within an aircraft cabin comprising means for supplying air under pressure within the cabin, an outlet valve, control means for said valve operable to produce a cabin pressure in excess of external pressure, and a second control means for said valve operable to prevent the attainment of a cabin pressure in excess of a selected differential over external pressure.

37. Mechanism to control aircraft cabin pressures, comprising, in combination with means to supply air under pressure within the cabin, means movable to regulate flow through and pressure within the cabin, differential-pressure responsive means operatively connected to the regulating means, and automatically operable thereupon to prevent the cabin pressure exceeding a selected differential, and absolute-pressure responsive means also operatively connected to the same regulating means, and automatically operable thereupon to effect elevation of cabin pressure above external pressure.

38. Mechanism to control aircraft cabin pressures, comprising, in combination with means to supply air under pressure within the cabin, means movable to regulate pressure within the cabin, differential-pressure responsive means operatively connected to the regulating means, and automatically operable thereupon to prevent the cabin pressure exceeding a selected differential, absolute-pressure responsive means also operatively connected to the same regulating means, and automatically operable thereupon to effect elevation of cabin pressure above external pressure, and flow-control means regulating the rate of pressure air supply, to maintain balance thereof with the pressure-controlling means at minimum rates of flow.

39. Mechanism to control aircraft cabin pressures, comprising, in combination with means to supply air under pressure within the cabin, an outflow valve movable to regulate pressure within the cabin, differential-pressure responsive means operatively connected to said outflow valve, and automatically operable thereupon to prevent cabin pressure exceeding a selected differential, and absolute-pressure responsive means also operatively connected to said outflow valve, and automatically operable thereupon to effect elevation of cabin pressure above external pressure.

40. Mechanism to control aircraft cabin pressures, comprising, in combination with means to supply air under pressure within the cabin, an outflow valve movable to regulate pressure within the cabin, differential-pressure responsive means operatively connected to said outflow valve, and automatically operable thereupon to prevent cabin pressure exceeding a selected differential, and absolute-pressure responsive means also operatively connected to said outflow valve, and automatically operable thereupon to effect elevation of cabin pressure above external pressure, and means to regulate the supply of pressure air in accordance with pressure conditions as determined by said outflow valve, and within the capacity of the latter and of its controls.

41. Mechanism to control aircraft cabin pressures, comprising, in combination with a supercharger connected to supply air within the cabin, and an outlet to discharge air from the cabin, an inlet valve and an outlet valve separately operable, an absolute-pressure sensitive means tending to close said outlet valve with decrease of cabin pressure, thereby tending to retain a cabin pressure elevated above external pressure, a further pressure sensitive device operable as a function of pressure differences between cabin pressure and atmospheric pressure, operatively connected to override said absolute-pressure sensitive means, and thereby to prevent the cabin pressure exceeding a selected differential, and means operable primarily under the influence of rate of flow, to regulate said inlet valve to maintain the pressure elevated within the cabin, and within the control capacity of the outlet valve and its controls.

42. Mechanism to control aircraft cabin pressures, comprising, in combination with a connection for supply of air under pressure to the cabin, and a connection for discharge of air from the cabin, a valve controlling flow-through, and therefore the cabin pressure, pressure-sensitive means to adjust said valve for control of cabin pressure, including a venturi in one such connection, and servo means operatively connected to said venturi to effect movement of the valve under control of the pressure-sensitive means.

43. Mechanism to control aircraft cabin pressures, comprising, in combination with a supercharger connected to supply air to the cabin, and an outlet to discharge air from the cabin, a venturi between the cabin and the outlet, an outlet valve controlling outflow from the cabin, pressure-sensitive means operatively connected to adjust said outlet valve for control of cabin pressure, and servo means operatively connected to said pressure-sensitive means to effect movement of the valve under control of the pressure-sensitive means.

44. The method of regulating aircraft cabin pressures which comprises supplying air under pressure within the cabin, while permitting continual outflow therefrom, regulating such outflow under the influence of the differential of cabin pressure over external pressure, in such manner that a selected differential can never be exceeded, and also restricting such outflow under the influence of cabin absolute pressure, in such manner as to build up cabin pressure to a value exceeding external pressure, up to the selected limiting differential.

45. The method of regulating aircraft cabin pressures which comprises supplying air under pressure within the cabin, while permitting continual outflow therefrom, regulating such outflow under the influence of the differential of cabin pressure over external pressure, in such manner that a selected differential can never be exceeded, and also restricting such outflow under the influence of cabin absolute pressure, in such manner as to build up cabin pressure to a value exceeding external pressure, up to a selected limiting differential, meanwhile balancing inflow in accordance with a flow factor, to supply adequate pressure for differential-pressure and absolute-pressure control, without excessive pressure or rate of inflow.

46. The method of regulating aircraft cabin pressures, which comprises supplying air under pressure within the cabin, while permitting continual outflow therefrom, maintaining a substantially constant rate of inflow in accordance with inflow pressure, up to a selected medium altitude, from such altitude upwardly, through a medium altitude range, restricting outflow under the influence of cabin absolute pressure to build up cabin pressure to a value exceeding external pressure, and at high altitudes regulating outflow under the influence of the differential of cabin pressure over external pressure, in such manner that a selected differential can never be exceeded.

47. The method of regulating aircraft cabin pressures, which comprises supplying air under pressure within the cabin, while permitting continual outflow therefrom, maintaining a substantially constant rate of inflow in accordance with inflow pressure, up to a selected medium altitude, from such altitude upwardly, through a medium altitude range, restricting outflow under the influence of cabin absolute pressure to build up cabin pressure to a value exceeding external pressure, and at high altitudes regulating outflow under the influence of the differential of cabin pressure over external pressure, in such manner that a selected differential can never be exceeded, and, throughout the medium and high altitude ranges, regulating inflow in accordance with rate of outflow, to supply adequate pressure for absolute-pressure and differential-pressure control, but to prevent the inflow of air under pressure at a rate materially in excess of that required by the same.

48. Mechanism for controlling the pressure within an aircraft cabin comprising means for continuously supplying air under pressure to such cabin and for discharging it therefrom, means to increase the cabin pressure to a value above the external pressure, and means automatically operable to modify the action of said pressure-increasing means, to prevent the cabin pressure exceeding a selected pressure above external pressure.

49. Means to regulate aircraft cabin pressure, comprising an outflow valve biased to close, means operable under the influence of cabin pressure, and operatively connected to the valve to hold it open, at all altitudes, for outflow, but only sufficiently, at certain altitudes, to create an elevated cabin pressure, and a control, operable in accordance with the difference of cabin pressure over external pressure, and operatively connected to said valve to automatically prevent such differential exceeding a selected value.

50. Means to regulate aircraft cabin pressure, comprising an outflow valve biased to close, servo means operatively connected to the valve, and subject to a difference of the pressure to which the cabin is subjected, over external pressure, said servo means being organized and arranged to maintain the valve open so long as cabin pressure equals or exceeds external pressure, and differential-pressure responsive means operatively connected to the valve to open the latter increasingly in accordance with a tendency to increase the differential pressure, thereby to prevent such differential exceeding a selected value.

51. Means to regulate aircraft cabin pressure, comprising an outflow valve, biased to close, servo means operatively connected to the valve, control means operatively associated with said servo means, and subject to a difference of cabin pressure over external pressure, said servo means and said control means being organized and arranged to open the valve increasingly with increasing differential pressure, thereby to prevent such differential exceeding a selected value.

52. Means to regulate aircraft cabin pressure, comprising an outflow valve biased to close, servo means operatively connected to the valve, control means operatively associated with said servo means, and subject to a difference of cabin pressure over external pressure, said servo means and said control means being organized and arranged to open the valve increasingly with increasing differential pressure, thereby to prevent such differential exceeding a selected value, and a second control means operatively associated with said servo means, arranged for automatic operation alternatively with said differential-pressure sensitive means, and itself subject to cabin absolute pressure, said servo means and said second control means being organized and arranged to close the valve increasingly with increasing altitude, thereby to maintain cabin pressure elevated above external pressure, within the limiting differential fixed by said differential-pressure sensitive means.

53. Means to regulate aircraft cabin pressure, comprising an outflow valve biased to seat, a piston operatively connected to move the valve, conduit means to subject the piston to a higher and a lower pressure, upon its opposite sides, tending to unseat the valve, and a control means to regulate the pressure difference acting upon said piston, and thereby the position of said valve and the cabin pressure, said control means being sensitive to the differential of cabin pressure over external pressure, and being organized and arranged, relative to said piston and valve, to prevent cabin pressure exceeding a selected differential.

54. Means to regulate aircraft cabin pressure, comprising an outflow valve biased to seat, a piston operatively connected to move the valve, conduit means to subject the piston to a higher and a lower pressure, upon its opposite sides, tending to unseat the valve, a control means to regulate the pressure difference acting upon said piston, and thereby the position of said valve and the cabin pressure, said control means being sensitive to the differential of cabin pressure over external pressure, and being organized and arranged, relative to said piston and valve, to prevent cabin pressure exceeding a selected differential, and a second control means arranged for automatic operation under the influence of cabin absolute pressure, alternatively with the differential-pressure sensitive control, and itself operable, at cabin pressures within the limiting differential, to subject the piston upon opposite sides to a higher and a lower pressure, respectively, whereby the valve is held open by a force which is primarily dependent upon cabin absolute pressure, and the cabin pressure is automatically maintained at a value above external pressure.

55. Means to regulate aircraft cabin pressure, comprising an outflow valve and a seat therefor, a servo piston operatively connected to said valve, and biased to close the valve, but subject to cabin pressure on one side, tending to open the valve, means to subject the piston, on its opposite side, to external pressure, likewise tending to open the valve with increase of altitude, and means adjustable in accordance with change of cabin pressure to maintain equilibrium between the valve-opening forces active upon said piston and the biasing forces tending to close the valve, to permit closing of the valve with increasing altitude, and thereby tending to maintain cabin pressure at an elevated value with increase of altitude.

56. Means to regulate aircraft cabin pressures, under the influence of an air pressure supply, comprising an outflow valve movable towards closed position to conserve cabin pressure and openable to decrease the same, a servo piston operatively connected to said valve, and biased to close the valve, but subject to cabin pressure on one side, tending to open the valve, means to apply lower external pressures to the opposite side of the piston, also tending to open the valve, the several forces thus acting upon the piston being arranged in equilibrium to maintain a given cabin pressure corresponding to each altitude, and means sensitive to change of altitude reacting to alter the last-mentioned means, and thereby to destroy the equilibrium of forces, to permit closing of the valve with increasing altitude, and thereby tending to maintain cabin pressure at an elevated value with increase of altitude.

57. Means to regulate the pressure within an aircraft cabin, which is elevated under the influence of an air pressure supply, said regulating means comprising an outflow valve closable to conserve cabin pressure and openable to decrease the same, absolute-pressure sensitive means operatively connected to said valve, and automatically operable in accordance with increase of altitude above a given value, to move said valve progressively towards closed position, with such increase of altitude, tending to maintain a constant cabin pressure, and means operatively connected to said valve, and automatically operable to open the valve in accordance with the differential of cabin pressure over external pressure, above a given value, to prevent such differential being exceeded.

58. Means to regulate aircraft cabin pressures, under the influence of an air pressure supply, comprising an outflow valve, closable to conserve cabin pressure and openable to decrease the same, means operatively connected to said valve, and automatically operable to move the valve towards open position in accordance with the differential of cabin pressure over external pressure, to prevent the cabin pressure exceeding a selected differential under all circumstances, and means also operatively connected to said valve, and automatically operable to move the valve towards closed position in accordance with increase of altitude above a given value, to prevent drop of cabin pressure at as rapid a rate as the external pressure drops, with increase of altitude.

59. Means to regulate aircraft cabin pressures, under the influence of an air pressure supply, comprising an outflow valve closable to conserve cabin pressure and openable to decrease the same, means operatively connected to said valve, and automatically operable to move the valve towards open position in accordance with the differential of cabin pressure over external pressure, to prevent the cabin pressure exceeding a selected differential under all circumstances, and means also operatively connected to said valve, and automatically operable to move the valve towards closed position in accordance with increase of altitude above a given value, to progressively increase the difference of cabin pressure over external pressure, with increase of altitude, and within the limiting differential fixed by said differential-pressure sensitive means.

60. An aircraft cabin pressure control comprising an outflow valve, a piston directly connected to said valve to move the latter, the piston-valve assembly being biased to close, passages to subject the piston on one side to cabin pressure and on the other side to a lower pressure, tending to hold the outflow valve open, control means arranged to regulate flow through the low-pressure passage, and thereby the pressure difference at opposite sides of the piston and the position of equilibrium of the outflow valve, and pressure-sensitive means, cooperating with said control valve means, and arranged for movement in response to change of cabin pressure, to automatically shift said control valve means, and thereby to compensatingly adjust the outflow valve.

61. In a cabin pressure control, an outflow valve, a piston connected to said valve to move the latter, the piston-valve assembly being biased to close, passages to subject the piston on one side to cabin pressure and on the other side to a lower pressure, tending to hold the valve open, control valve means arranged to regulate the pressure difference at opposite sides of the piston, said control valve means including a hollow stem included in the passage which admits to one side of the piston, and an aligned valve stem movable with the outflow valve, and normally materially restricting flow through the hollow stem, and a pressure-sensitive means arranged for movement in response to change in the difference of cabin pressure over external pressure, and operatively connected to shift said hollow stem relative to the cooperating valve stem, and thereby to compensatingly adjust the outflow valve.

62. The control as defined in claim 61, wherein the pressure-sensitive means is an absolute-pressure sensitive means, exposed to and responsive to changes in cabin pressure.

63. The control as defined in claim 61, wherein the pressure-sensitive means is a differential-pressure sensitive means, exposed to and responsive to changes in either of the external pressure and the cabin pressure.

64. A system for the control of pressure within an aircraft cabin, comprising a source of air under pressure connected to discharge within the cabin, means variably controlling outflow from the cabin, conformably to external atmospheric pressure at different altitudes, to create a difference of cabin pressure over external pressure, and means to vary the rate of delivery from the pressure source to the cabin, conformably to the outflow rate and desired pressure difference, to maintain such pressure difference without excessive rate of flow.

65. A system for the control of pressure within an aircraft cabin, comprising a source of air under pressure connected to discharge within the cabin, valve means controlling outflow, means sensitive to external atmospheric pressure arranged to variably regulate said valve means in conformity to external pressure at different altitudes, to create an elevated cabin pressure, and means sensitive to flow through the cabin to vary the rate of delivery to the cabin from the pressure source, conformably to the rate of discharge past the valve means, to maintain such elevated cabin pressure, and continual ventilation, without an excessive rate of flow.

66. A system for the control of pressure within an aircraft cabin, comprising a blower connected to discharge within the cabin, a valve and pressure-sensitive control means therefor automatically controlling outflow from the cabin to create cabin pressures which, above a selected altitude, are elevated above external pressures, and means sensitive to flow through the cabin to regulate the rate of delivery from the blower to the cabin, conformably to the rate of discharge past the valve means.

67. A system for the control of pressure within an aircraft cabin, comprising a source of air under pressure connected to discharge within the cabin, means to regulate the effective rate of pressure supply to the cabin, means variably controlling outflow from the cabin, conformably to external atmospheric pressures at different altitudes, to create a difference of cabin pressure over external pressure, and means sensitive to reduction of outflow, and automatically operable thereby to adjust said pressure-supply-regulating means to increase the effective rate of pressure supply, and vice versa, thereby to maintain the desired pressure difference, without excessive rate of flow.

68. Mechanism to control aircraft cabin pressures, comprising in combination with means to supply air under pressure to the cabin, an outflow valve continually open for discharge of air from the cabin, differential-pressure responsive means operable to control said valve to prevent exceeding a given cabin pressure differential over external pressures, and absolute-pressure responsive means automatically operable, likewise to control said valve, to create a cabin pressure which is elevated above external pressure.

69. Mechanism to control aircraft cabin pressures, comprising in combination with means to supply air under presure to the cabin, means to afford and control continual flow through the cabin, differential-pressure responsive means operable to control said flow-controlling means to prevent exceeding a given cabin pressure differential over external pressures, and absolute-pressure responsive means automatically operable, inside such differential, likewise to control such flow-controlling means, to create a cabin pressure which is elevated above external pressure.

70. Mechanism to control aircraft cabin pressures, comprising, in combination with means to supply air under pressure within the cabin, means operable to regulate pressure within the cabin, differential-pressure responsive means operatively connected to said pressure-regulating means, and automatically operable thereupon to prevent cabin pressure exceeding a selected differential, and absolute-pressure responsive means also operatively connected to said pressure-regulating means, and automatically operable thereupon to effect elevation of cabin pressure above external pressure and means to regulate the supply of pressure air in conformity with pressure conditions as determined by said pressure-regulating means, and within the capacity of the latter and its controls.

71. Mechanism for control of aircraft cabin pressures, comprising, in combination with means to supply air under pressure within the cabin, and an outflow port continually open at all altitudes, differential-pressure responsive means to regulate outflow through said port, to prevent cabin presure exceeding a selected differential over external pressure, and absolute-pressure responsive means also regulating such outflow through said port, to create an elevated cabin pressure.

72. Means to regulate pressure within an aircraft cabin, comprising valve means closable to restrict outflow relative to inflow and thereby to increase cabin pressure, and means sensitive to external pressure operatively connected to close or open said valve means at a rate which is a function of the rate of change of such external pressure, and thereby to vary the cabin pressure at a rate bearing a predetermined relation to the rate of change of external pressure, and differential-pressure sensitive means operatively connected to modify the action of said valve means, to prevent cabin pressure from exceeding the external pressure by more than a selected amount.

73. A system for the control of pressure within an aircraft cabin which has an inlet port and an outlet port continually open for ventilating flow-through, comprising means controlling airflow through one port, and separate means controlling airflow through the other port, flow-sensitive means governing one such airflow-controlling means, to limit the rate of flow-through, and pressure-sensitive means governing the other such airflow-controlling means, to increase cabin pressure over external pressure.

74. A system as in claim 73, characterized in that the flow-sensitive means governs inflow, and the pressure-sensitive means governs outflow.

75. A system as in claim 73, characterized in that each of the airflow-controlling means is a valve, variably open to govern flow-through or cabin pressure, as the case may be.

76. Mechanism for controlling the pressure within an aircraft cabin comprising means to supply air under pressure within the cabin, an outlet valve, and two control means for said valve, one of said control means being sensitive to absolute pressure, and being operatively connected to said valve to maintain cabin pressure elevated above external pressure during a given altitude range, and the other of said control means being sensitive to the difference of cabin pressure over external pressure, and being operatively connected to said valve to maintain a selected differential through a different altitude range.

77. Mechanism for controlling the pressure within an aircraft cabin comprising means to supply air under pressure within the cabin, valve means to regulate outflow and hence pressure within the cabin, a control device sensitive to absolute pressure, and a second control device sensitive to the difference of cabin pressure over external pressure, each of said control devices being operatively connected to the valve means to maintain cabin pressure elevated above external pressure through a selected altitude range, and to maintain a cabin pressure differential which is not in excess of a selected value for a different selected altitude range.

78. Mechanism for controlling the pressure within an aircraft cabin comprising means to supply air under pressure within the cabin, an outflow valve, two control means operatively connected to the valve, one of said control means being operable automatically in accordance with the relation of cabin pressure to external pressure, to prevent a selected relationship being exceeded, at any altitude, and the second being sensitive to a cabin pressure factor, to automatically create and maintain cabin pressure elevated above exterior pressure, from a selected altitude upward, within the limit fixed by said first-mentioned control.

79. Mechanism for controlling the pressure within an aircraft cabin whereinto fresh air is supplied under pressure and whence stale air is discharged, comprising a device to regulate inflow and a device to regulate outflow, said devices cooperatively constituting a means to regulate pressure within the cabin, a flow-sensitive control operatively connected to said pressure-regulating means to maintain a predetermined rate of flow through the cabin, regardless of cabin pressure or of external pressure, and a pressure-sensitive control operatively connected to said pressure regulating means to create a predetermined elevated cabin pressure throughout a selected altitude range.

80. Mechanism as set forth in claim 79, characterized in that the inflow and outflow regulating devices are operative at all altitudes to create a continuous flow through the cabin, and the flow-sensitive device is also operative at all altitudes to maintain a substantially constant rate of flow through the cabin.

81. Mechanism as set forth in claim 79, characterized in that the pressure-sensitive control includes both an absolute-pressure control to create elevated cabin pressures throughout at least a portion of the selected altitude range, and a differential-pressure control to limit the differential pressure throughout some portion of such selected altitude range.

82. Mechanism for controlling the pressure within an aircraft cabin whereinto fresh air is continuously supplied under pressure and whence stale air is continuously discharged, at all altitudes, comprising a device to regulate inflow and a valve continuously open at all altitudes to regulate outflow, said device and said valve cooperatively constituting a means to regulate pressure within the cabin, an absolute-pressure control and a differential-pressure control each operatively connected to said pressure-regulating means to maintain a substantially constant rate of flow through the cabin, regardless of cabin pressure, and to create a cabin pressure which is elevated above external pressure throughout a selected altitude range, and to limit the differential of cabin pressure over external pressure throughout a portion, at least, of such selected altitude range.

83. Mechanism to control the pressure within an aircraft cabin, whereinto air is supplied under pressure, comprising an outflow valve, pressure-sensitive means, conduit means connecting said pressure-sensitive means to a high pressure source which is related to the cabin pressure, and to atmosphere and said pressure-sensitive means being operatively connected to move said valve, and means to vary the rate of flow through one of said conduit means, and relative to the rate of flow through the other, thereby to vary the pressure difference acting upon said pressure-sensitive means, and hence the setting of said outflow valve.

84. Mechanism to control the pressure within an aircraft cabin, whereinto air is supplied under pressure, comprising valve means to control flow through and hence pressure within the cabin, pressure-sensitive means operatively connected to move said valve means, conduit means connecting said pressure-sensitive means to a high pressure source related to the cabin pressure and to atmosphere means to vary the relative rate of flow through said conduit means, thereby to vary the pressure difference acting upon said pressure-sensitive means, and hence the setting of said valve means.

85. Mechanism to control the pressure within an aircraft cabin, whereinto air is supplied under pressure, comprising valve means to control flow through and hence pressure within the cabin, pressure-sensitive means operatively connected to move said valve means, conduit means connecting said pressure-sensitive means to a cabin inlet pressure source and to an atmospheric pressure source, and means to vary the relative rate of flow through said conduit means, thereby to vary the pressure difference acting upon said pressure-sensitive means, and hence the setting of said valve means, said mechanism further including means to govern said rate-of-flow-varying means automatically in accordance with a cabin pressure factor.

86. Mechanism to control the pressure within an aircraft cabin, whereinto air is supplied under pressure, comprising an outflow valve, pressure-sensitive means, conduit means connecting said pressure-sensitive means to a cabin inlet pressure source and also to an atmospheric pressure source, one of which is related to the cabin pressure, and said pressure-sensitive means being operatively connected to move said valve, and means to vary the rate of flow through one of said conduit means, and relative to the rate of flow through the other, thereby to vary the pressure difference acting upon said pressure-sensitive means, and hence the setting of said outflow valve, said mechanism further including means to govern said rate-of-flow-varying means automatically in accordance with an external pressure factor.

87. Mechanism for controlling pressure within a supercharged aircraft cabin, comprising valve means movable to vary the rate of flow through the cabin for governing the differential of cabin pressure over external pressure, means sensitive to a high pressure source which is related to the cabin pressure and to external pressure, operatively connected to move said valve means, conduit means connecting said pressure-sensitive means to each of said pressure sources, and means operable to vary the accessibility of said pressure sensitive means to one or the other pressure source, thereby to alter the differential between cabin pressure and atmospheric pressure.

88. Mechanism to control the supply of air under pressure to an aircraft cabin, comprising an inlet duct for supply of air to the cabin, means to control flow of air through said inlet duct into the cabin, pressure sensitive means operatively connected to move said flow controlling means, conduit means connecting said pressure sensitive means to cabin inlet duct flow pressure and to cabin inlet duct static pressure, thereby to vary the pressure difference acting upon said pressure sensitive means, and hence the setting of said flow control means.

89. Mechanism to control the supply of air under pressure to an aircraft cabin, comprising an inlet duct for supply of air to the cabin, an outlet duct for flow of air from the cabin, means to control flow of air through said inlet duct into the cabin, pressure sensitive means operatively connected to move said flow controlling means, conduit means connecting said pressure sensitive means to cabin outlet duct flow pressure and to cabin static pressure, thereby to vary the pressure difference acting upon said pressure sensitive means, and hence the setting of said flow control means.

NATHAN C. PRICE.

CERTIFICATE OF CORRECTION.

Reissue No. 22,272. February 16, 1943.

NATHAN C. PRICE.

It is hereby certified that error appears in the printed specification of the above numbered patent requiring correction as follows: Page 12, first column, line 51, claim 23, after the word "from" strike out "between": second column, line 26, claim 26, after "operable" insert --to regulate said control means--; line 57, claim 28, for "extenal" read --external--; page 13, first column, line 62, claim 35, for "pressure" read --pressures--; page 14, first column, line 51, claim 45, for "a" read --the--; page 16, second column, line 39, claim 70, after the word "pressure" insert a comma; and that the said Letters Patent should be read with this correction therein that the same may conform to the record of the case in the Patent Office.

Signed and sealed this 20th day of April, A. D. 1943.

Henry Van Arsdale,
Acting Commissioner of Patents.

(Seal)